(12) United States Patent
Bumgarner et al.

(10) Patent No.: US 8,079,578 B2
(45) Date of Patent: Dec. 20, 2011

(54) UNIVERSAL HOLDING FIXTURE

(75) Inventors: Karl Bumgarner, Bothell, WA (US); Craig Lebakken, Woodenville, WA (US); Chuong Vando, Everett, WA (US); William Reddie, Shoreline, WA (US); Glenn Jacovetti, Oxford, MI (US)

(73) Assignee: HGS Aerospace, Inc., Shelby Township, MI (US)

( * ) Notice: Subject to any disclaimer, the term of this patent is extended or adjusted under 35 U.S.C. 154(b) by 1048 days.

(21) Appl. No.: 11/899,281

(22) Filed: Sep. 5, 2007

(65) Prior Publication Data

US 2009/0057971 A1 Mar. 5, 2009

(51) Int. Cl.
*B25B 11/00* (2006.01)

(52) U.S. Cl. ............... 269/21; 269/24; 269/32

(58) Field of Classification Search ............ 269/21, 269/24–27, 32; 29/743; 414/627, 737
See application file for complete search history.

(56) References Cited

U.S. PATENT DOCUMENTS

| | | | | |
|---|---|---|---|---|
| 4,088,312 A | * | 5/1978 | Frosch et al. | 269/21 |
| 4,200,272 A | * | 4/1980 | Godding | 269/26 |
| 4,684,113 A | * | 8/1987 | Douglas et al. | 269/21 |
| 5,046,707 A | * | 9/1991 | Allen | 269/309 |
| 5,168,635 A | | 12/1992 | Hoffman | 33/561.1 |
| 5,364,083 A | * | 11/1994 | Ross et al. | 269/21 |
| 5,407,184 A | * | 4/1995 | Hollis et al. | 269/60 |
| 5,422,554 A | * | 6/1995 | Rohde | 318/568.21 |
| 5,427,363 A | * | 6/1995 | Rink et al. | 269/21 |
| 5,846,464 A | | 12/1998 | Hoffman | 264/219 |
| 6,131,273 A | * | 10/2000 | Heeren et al. | 29/759 |
| 6,209,188 B1 | * | 4/2001 | Soderberg et al. | 29/559 |
| 6,378,190 B2 | | 4/2002 | Akeel | 29/407.08 |
| 6,476,525 B2 | | 11/2002 | Sato et al. | 310/20 |
| 6,502,808 B1 | * | 1/2003 | Stone et al. | 269/21 |
| 6,619,147 B1 | | 9/2003 | Kojima | 74/89.36 |
| 6,629,354 B1 | | 10/2003 | Kline | 29/559 |
| 6,702,268 B1 | * | 3/2004 | Nascimben | 269/21 |
| 6,705,199 B2 | | 3/2004 | Liao et al. | 91/363 R |
| 6,756,707 B2 | | 6/2004 | Hochhalter et al. | 310/20 |
| 6,772,784 B1 | * | 8/2004 | Jones et al. | 137/102 |
| 6,794,779 B2 | | 9/2004 | Ma et al. | 310/80 |

(Continued)

FOREIGN PATENT DOCUMENTS

JP 58165975 A 10/1983

(Continued)

OTHER PUBLICATIONS

Mar. 4, 2009 International Search Report and Written Opinion for International Application No. PCT/US2008/010379.

*Primary Examiner* — George Nguyen

(74) *Attorney, Agent, or Firm* — Bliss McGlynn, P.C.

(57) ABSTRACT

A universal holding fixture assembly includes a plurality of linear actuators supported by the fixture and adapted to engage and support a workpiece relative to the fixture. A linear displacement member is supported by a housing and adapted to move between retracted and extended positions. An end effector assembly is operatively supported by the linear actuator and adapted to engage the workpiece when the linear displacement member is in its extended position. A sensor is operatively supported by the end effector assembly and is responsive to contact with the workpiece to establish a datum of the position of the linear actuator relative to the workpiece.

49 Claims, 6 Drawing Sheets

U.S. PATENT DOCUMENTS

| | | | |
|---|---|---|---|
| 6,870,989 B1 * | 3/2005 | Devenyi et al. | 385/39 |
| 7,048,073 B2 * | 5/2006 | Hezeltine | 173/1 |
| 7,100,465 B1 | 9/2006 | Hollis et al. | 74/89.39 |
| 7,121,539 B2 | 10/2006 | McCormick et al. | 269/239 |
| 7,141,752 B2 | 11/2006 | Hochhalter et al. | 219/86.25 |
| 7,334,306 B2 * | 2/2008 | Beverley et al. | 29/281.1 |
| 7,407,070 B2 * | 8/2008 | Hezeltine | 227/10 |
| 7,476,050 B2 * | 1/2009 | Ditzler | 403/39 |
| 7,495,359 B2 * | 2/2009 | Klinke et al. | 310/51 |
| 7,752,755 B2 * | 7/2010 | Heinrich et al. | 29/889 |
| 2006/0175068 A1 * | 8/2006 | Hezeltine | 173/1 |
| 2007/0261506 A1 * | 11/2007 | Ymker | 74/89.33 |

FOREIGN PATENT DOCUMENTS

| | | |
|---|---|---|
| JP | 02303771 A | 12/1990 |
| KR | 1020020009241 A | 2/2002 |
| KR | 1020020032201 A | 5/2002 |

* cited by examiner

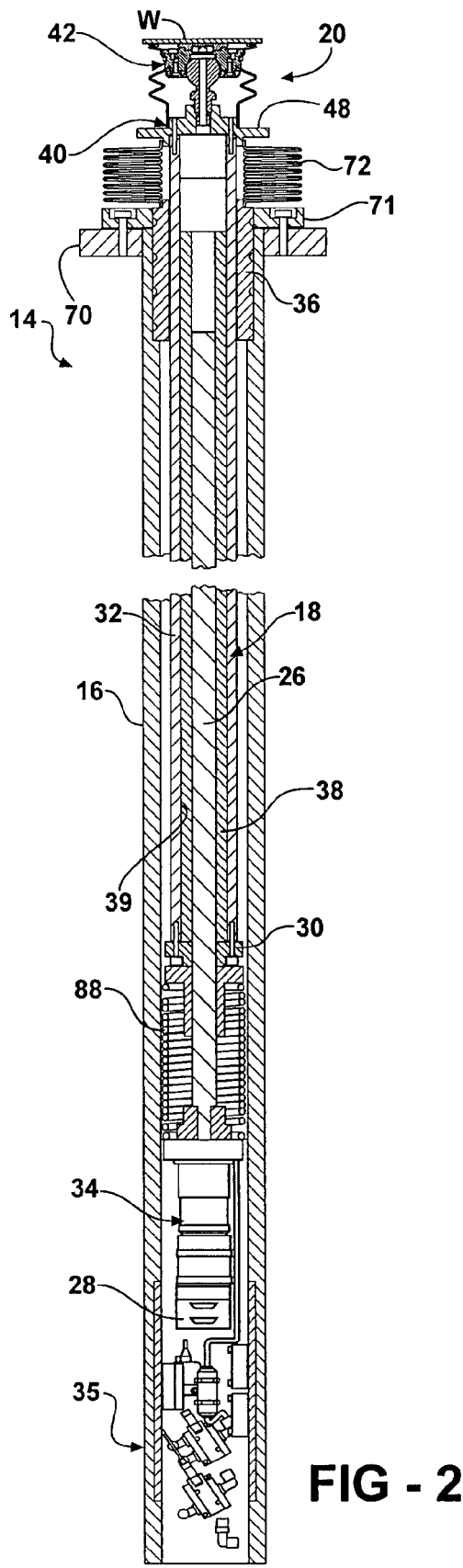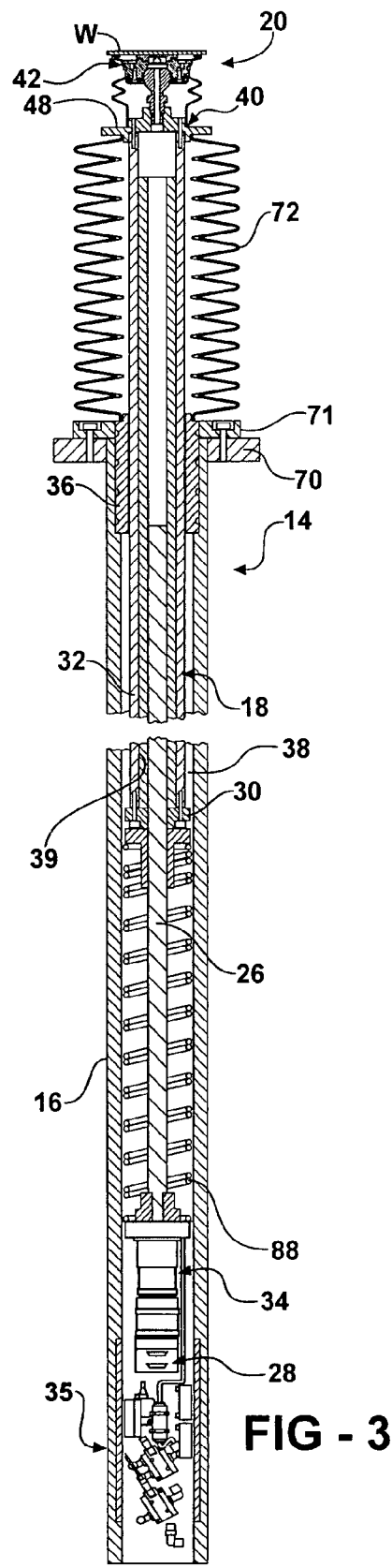
FIG - 2
FIG - 3

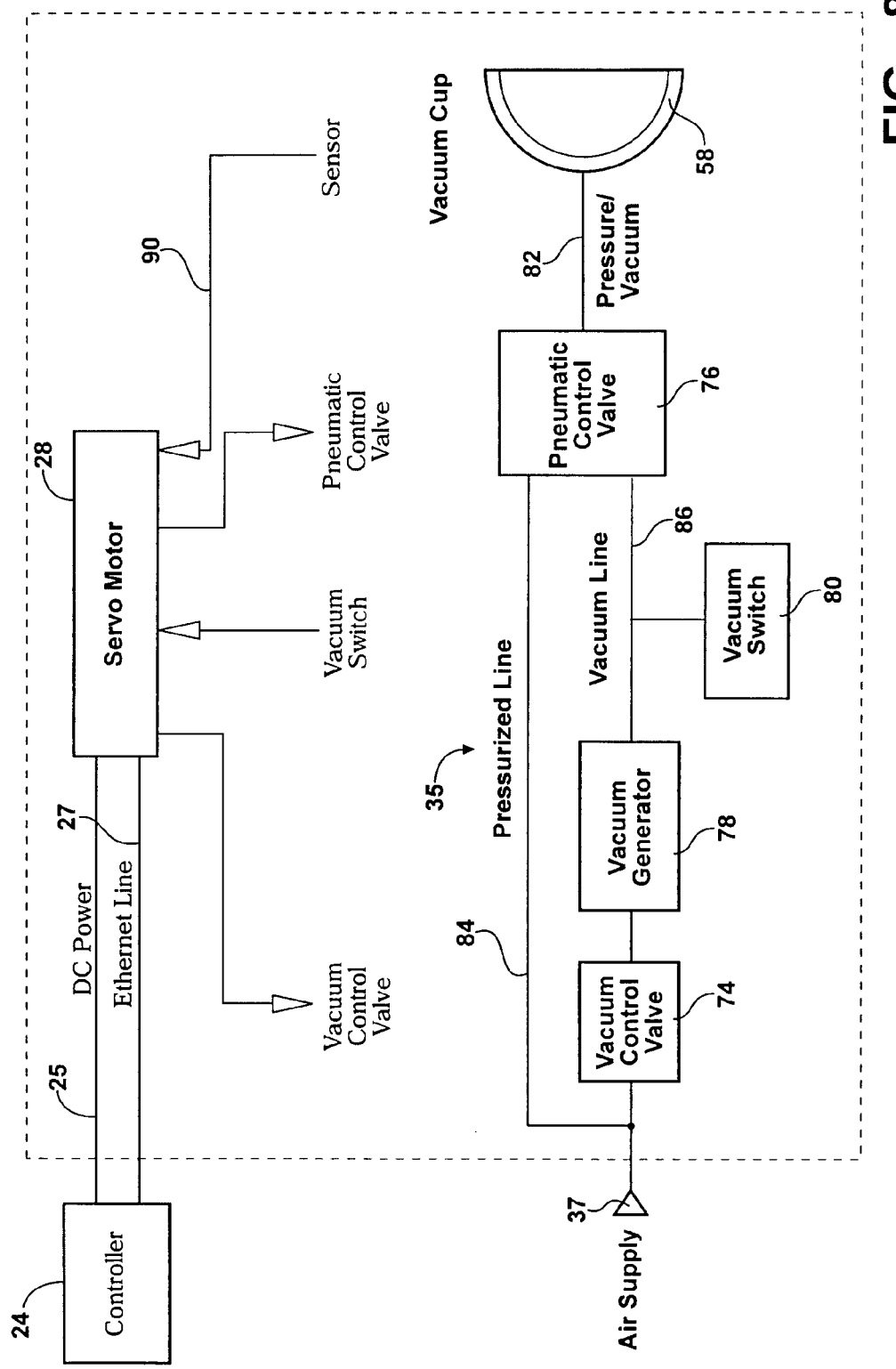

UNIVERSAL HOLDING FIXTURE

BACKGROUND OF THE INVENTION

1. Field of the Invention

The present invention relates, generally, to a universal holding fixture, and more specifically, to a universal holding fixture that employs the linear actuator of the present invention.

2. Description of the Related Art

During any given manufacturing process, there may be a need to fix a workpiece in a specific position, especially during precision cutting, trimming, drilling or welding operations, or the like. For example, in the automotive and aerospace industry, it is often necessary to perform various manufacturing processes on large workpieces or on a pair of workpieces that are to be joined or otherwise coupled together. During this process, each workpiece must be precisely located and then held in a predetermined position. It is therefore known to use dedicated fixtures having clamps and locating pins or other devices for this purpose. Such dedicated fixtures are known as "hard tooling." Where large workpieces are involved in cutting, trimming, drilling, welding or other manufacturing operations, the workpiece must be clamped or otherwise fixed at a number of positions across its surface area. Often, these clamps or mounting points must be engineered so that they do not interfere with the manufacturing process. Accordingly, the clamps and mounting points must be located such that they are not in the path of the cutting, trimming, drilling or welding operations, to name just a few. Thus, hard tooling of this type is often specific to the particular workpiece in question and cannot be utilized to fix, locate and hold workpieces other than the ones for which they were specifically designed. Unfortunately, such hard tooling is relatively expensive and has a useful life that is often limited by the life of the particular workpiece or the end product that employs the workpiece. In manufacturing environments where the design of the end product is constantly evolving or changing, the cost of hard tooling is a particularly noticeable burden on the overall cost to produce many products.

In view of the limitations associated with hard tooling, more flexible fixtures have been proposed and developed in the related art. These devices are sometimes referred to as "programmable tooling" or "programmable fixtures." There are many varieties of programmable tooling and they are typically distinguished by the particular problem solved or industry served. However, the programmable fixtures of the type generally known in the related art are all characterized by the ability to be used on or in connection with more than one workpiece. Thus, the lifespan of this type of tooling extends beyond a particular design of the workpiece involved.

For example, one type of programmable tooling known in the related art includes a two-dimensional array of linear actuators that may be actuated to engage and hold a workpiece or a pair of workpieces upon which any given manufacturing process is to be performed. The linear actuators may be programmed to adapt to the irregular surfaces of any given workpiece and may be reprogrammed for use with a different workpiece having a different profile.

While programmable fixtures of this type have generally worked for their intended purposes, some disadvantages remain. For example, while the tooling may be programmable so that it can adapt to workpieces of different size and shape, the programmable fixtures of the type commonly known in the related art are typically not capable of reacting to a manufacturing process to actively move a holding or locating component, such as a linear actuator, out of the path of a cutting, drilling or welding operation and then to move the locating component back into a predetermined holding or locating position relative to the workpiece after the operation has passed. Rather, the linear actuator located in the path of any given manufacturing processes are typically programmed not to engage the workpiece in the first place. In this way, any conflict with the manufacturing process is avoided. Moreover, the linear actuator of the type typically employed in programmable fixtures known in the related art generally do not have the capability to identify the exact location of the workpiece nor the exact location of any subcomponent of the workpiece. In addition, while the linear actuators known in the related art have generally worked for their intended purposes, they suffer from the disadvantage that they can deflect from their designed location when they are in the extended position and subject to heavier loads. The linear actuators and programmable holding fixtures known in the related art also tend to be rather complex devices that are expensive to build and maintain.

Accordingly, there remains a need in the art for a holding fixture that is flexible and may be employed in connection with different workpieces in subsequent or different manufacturing processes. Thus, there remains a need in the art for a holding fixture that is universal and may be employed in a number of different environments on a number of different workpieces. Moreover, there remains a need in the art for such a holding fixture that employs linear actuators to quickly fix the workpiece and to establish a datum at a plurality of points relative to the workpiece to precisely locate it. In addition, there remains a need in the art for a universal holding fixture that employs a linear actuator that not only fixes and locates the workpiece, but which may be quickly and efficiently moved relative to the workpiece during different manufacturing operations such that these operations may proceed unimpeded by the presence of the linear actuator. There also remains a need in the art for a universal holding fixture that employs an electronically controlled linear actuator having a pneumatic control module for delivering both positive and negative pressure at the workpiece. Finally, there remains a need in the art for a programmable holding fixture and associated linear actuator that are robust, yet are relatively mechanically simple having a reduced number of components and, accordingly, reduced cost of manufacture.

SUMMARY OF THE INVENTION

The present invention overcomes the disadvantages in the related art in a universal holding fixture assembly having a fixture and a plurality of linear actuators supported by the fixture and adapted to engage and support a workpiece relative to the fixture. Each of the linear actuators includes a housing operatively mounted to the fixture and a linear displacement member supported by the housing. The linear displacement members are adapted to move linearly between a retracted position and an extended position. An end effector assembly is operatively supported by the linear actuator and adapted to engage the workpiece when the linear displacement member is in its extended position. A sensor is operatively supported by the end effector assembly and responsive to contact with the workpiece to establish a datum of the position of the linear actuator relative to the workpiece.

In this way, the universal holding fixture assembly of the present invention is extremely flexible and may be employed in connection with different workpieces and subsequent or different manufacturing processes. The universal holding fixture assembly of the present invention employs linear actuators that quickly fix the workpiece and establish a datum and a plurality of points relative to the workpiece to precisely locate it. In addition, each of the linear actuators may be quickly and efficiently moved relative to the workpiece during different manufacturing operations such that these operations may proceed unimpeded by the presence of the linear actuator. Finally, the universal holding fixture assembly of the present invention and the associated linear actuators are robust, yet relatively mechanically simple and have a reduced number of components and accordingly, have a reduced cost of manufacture relative to many other universal holding fixtures known in the related art.

BRIEF DESCRIPTION OF THE DRAWINGS

Other advantages of the invention will be readily appreciated as the same becomes better understood by reference to the following detailed description when considered in connection with the accompanying drawings, wherein:

FIG. 2 is a cross-sectional side view illustrating the linear actuator of the present invention disposed in its fully retracted position;

FIG. 3 is a cross-sectional side view illustrating the linear actuator of the present invention disposed in an extended position;

FIG. 8 is a schematic diagram illustrating the electrical and pneumatic contents associated with the linear actuator of the present invention.

DETAILED DESCRIPTION OF THE INVENTION

Figure 1:
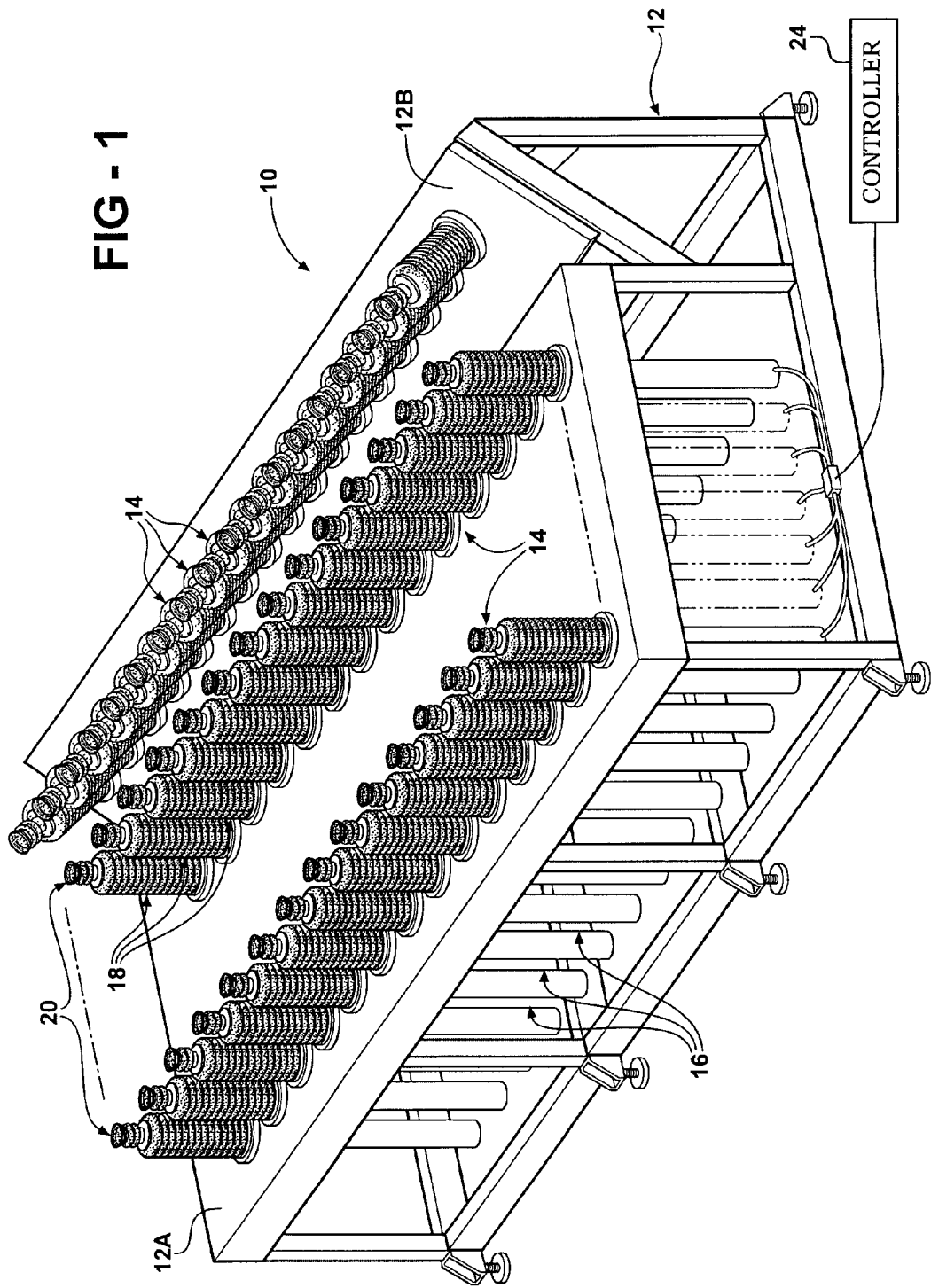
FIG. 1 is a representative example of the universal holding fixture assembly of the present invention.
Figure 4:
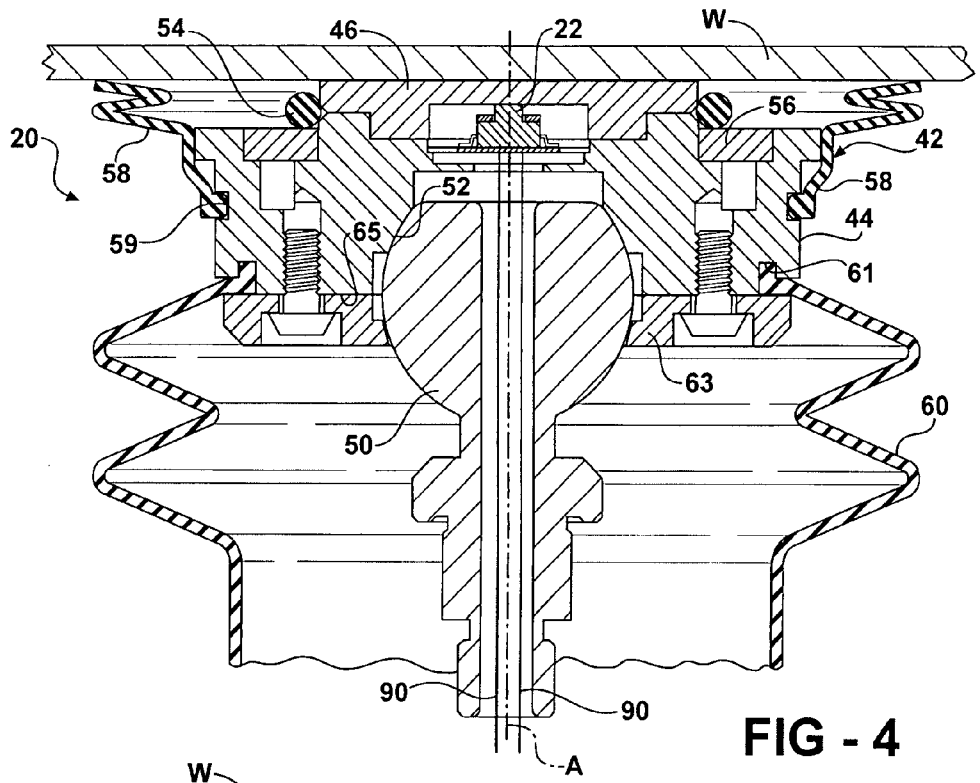
FIG. 4 is an enlarged cross-sectional side view of the end effector assembly of the present invention shown engaged relative to the workpiece W.
Figure 5:
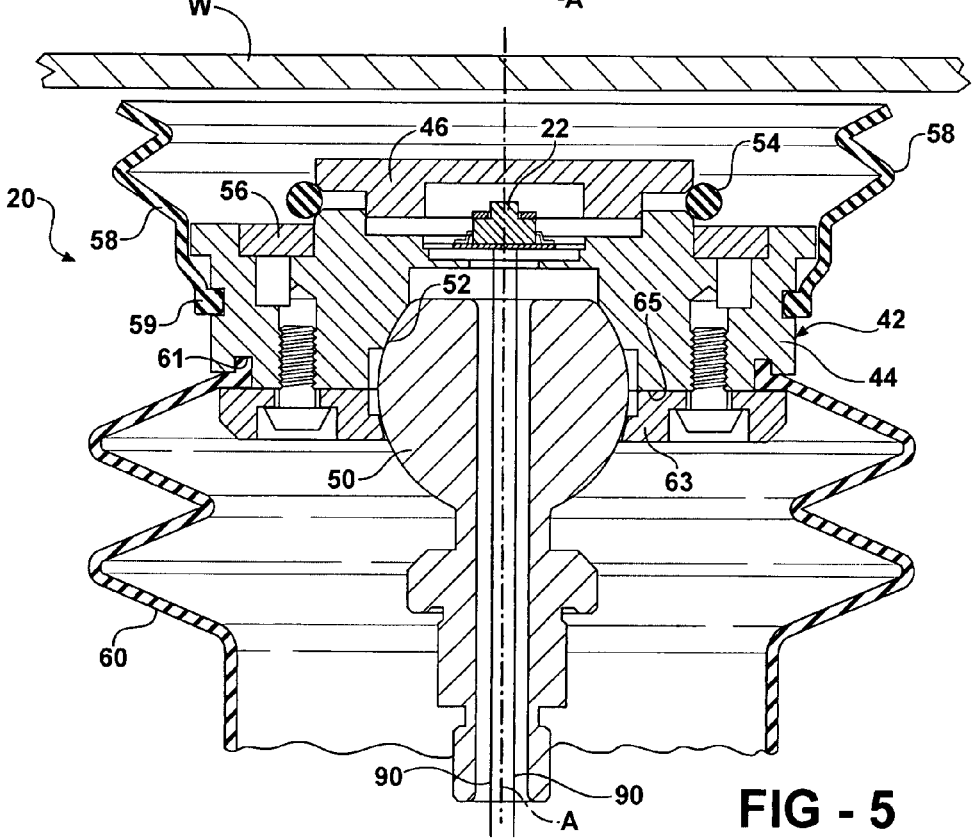
FIG. 5 is an enlarged cross-sectional side view of the end effector assembly of the present invention shown spaced from the workpiece W.
Figure 6:
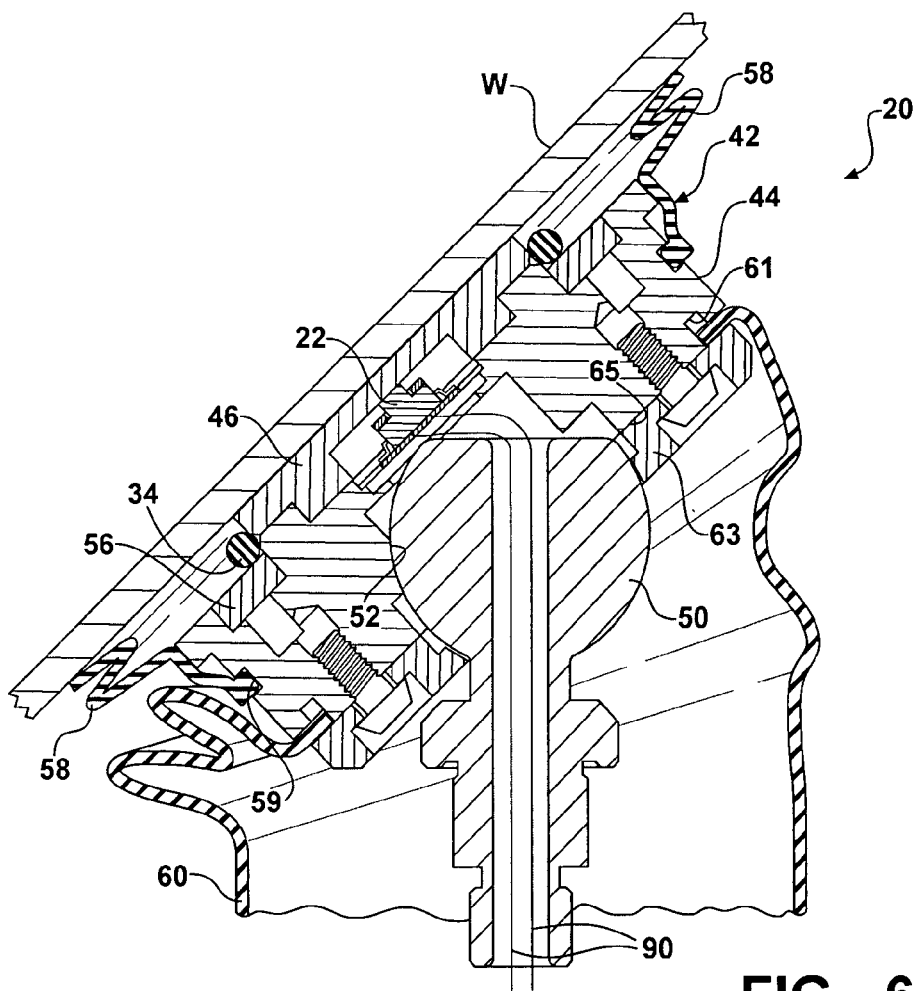
FIG. 6 is an enlarged cross-sectional side view of the datum assembly shown articulated relative to the adapter engaged relative to a workpiece W.
Figure 7B:
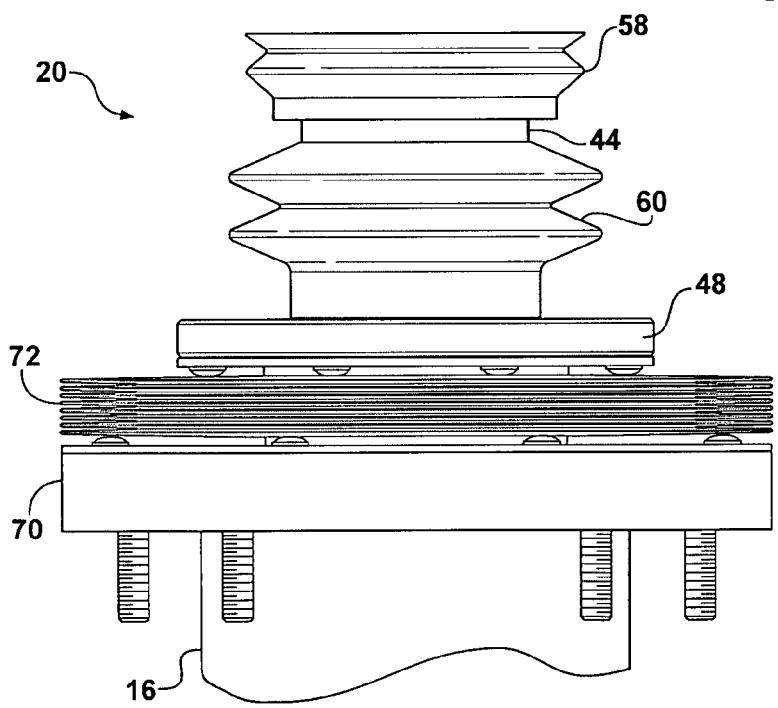
FIG. 7B is a enlarged partial side view of a portion of the linear actuator illustrated in FIG. 7.
Figure 7:
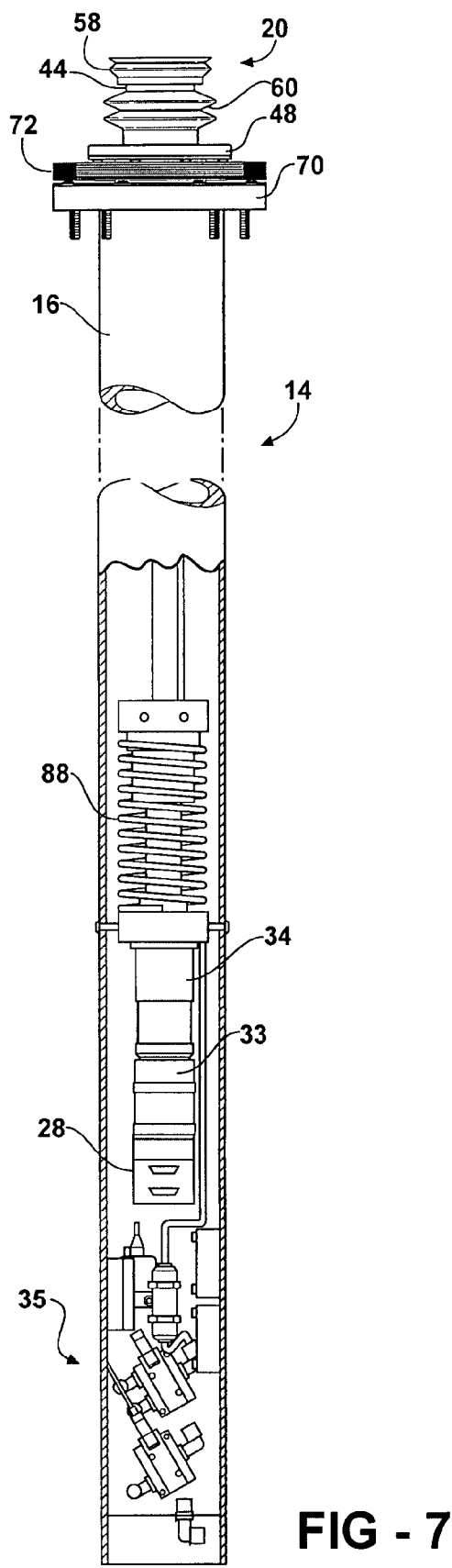
FIG. 7 is a simplified partial cross-sectional side view of the linear actuator of the present invention.
Figure 7A:
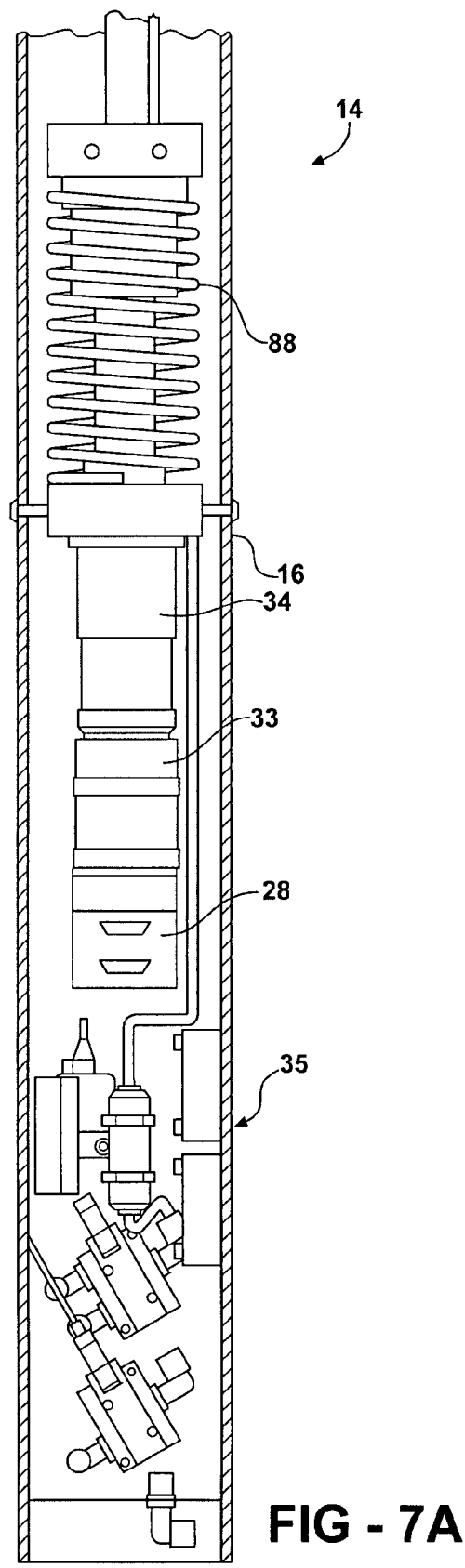
FIG. 7A is an enlarged simplified partial cross-sectional side view of a portion of the linear actuator illustrated in FIG. 7.

A universal holding fixture assembly of the present invention is generally indicated at 10 in FIG. 1, where like numerals are used to designate like components throughout the drawings. The universal holding fixture assembly 10 includes a fixture, generally indicated at 12, and a plurality of linear actuators, generally indicated at 14. Each of the linear actuators 14 are supported by the fixture 12 and adapted to engage and support a workpiece W relative to the fixture 12. Each of the linear actuators 14 include a housing, generally indicated at 16, that is operatively mounted to the fixture 12. A linear displacement member, generally indicated at 18 is supported by the housing 16 and is adapted to move linearly between a retracted position (FIG. 2) and an extended position (FIG. 3). An end effector assembly is generally indicated at 20 and is operatively supported by the linear actuator 14 and adapted to engage the workpiece W when the linear displacement member 18 is in the extended position. A sensor 22 is best shown in FIGS. 4-6 and is operatively supported by the end effector assembly 20. The sensor 22 is responsive to contact with the workpiece W to establish a datum of the position of the linear actuator 14 relative to the workpiece W. In one embodiment illustrated in FIG. 1, the plurality of linear actuators 14 may define a two-dimensional array that includes a controller 24 that is adapted to individually control each one of the plurality of linear actuators 14 such that the linear displacement members 18 may be selectively moved from their retracted positions to their extended positions to engage the workpiece W. Moreover, each one of the linear actuators 14 may be controlled by the controller 24 such that the linear displacement members 18 may be selectively moved from the extended position to the retracted position to clear the linear displacement member 18 out of the path of a manufacturing operation. Each one of the linear actuators 14 may also be controlled by the controller 24 to sense the datum established by the sensors 22 with respect to the workpiece W. Each of these components and their functions will be described in greater detail below.

In one embodiment illustrated in FIG. 1, the fixture 12 defines a "table" having a horizontal component 12A and an angular component 12B. The horizontal component 12A is disposed generally parallel to the plane defined by a portion of the workpiece W. The angular component 12B is disposed at an angle relative to the horizontal component 12A to adapt to the contoured shape of the particular workpiece W that is the subject of the manufacturing process illustrated here. Thus, the angular component 12B of the fixture 12 may be moved into this position by any suitable means or may be designed to be disposed in any angular position relative to the horizontal component 12A, as the case may be. However, those having ordinary skill in the art will appreciate from the description that follows that the fixture 12 and its subcomponents 12A and 12B are merely representative of one type of fixture and that the present invention is in no way limited to the particular geometric shape or angular disposition of the fixture 12. In addition, while the description that follows will focus on a single linear actuator 14, those having ordinary skill in the art will appreciate that this description applies equally to each of the linear actuators 14 illustrated in FIG. 1.

More specifically, each of the linear displacement members 18 include a ball screw 26 that is mounted for rotation within the housing 16. A drive motor is schematically illustrated at 28 in FIGS. 2-3, 7 and 7a. The drive motor 28 is operatively mounted to the housing 16. The drive motor 28 has a rotational output and is adapted to drive the ball screw 26. A nut 30 is mounted to the ball screw 26 and is adapted to move linearly relative to the housing 16 in response to rotation of the ball screw 26. A reciprocating extension member 32 is operatively coupled to the nut 30 and extends between the nut 30 and the end effector 20. As best shown in FIGS. 2-3, the nut 30 acts to move the reciprocating extension member 32 between its retracted and extended positions as will be described in greater detail below.

The linear actuators 14 further include a transmission, schematically illustrated at 34, operatively disposed between the drive motor 28 and the ball screw 26. The transmission 34 acts to reduce the speed and increase the torque of the rotational output of the drive motor 28. An electronically controlled brake 33 is positioned between the drive motor 28 and the transmission 34 to prevent any back drive of the ball screw 26 relative to the drive motor 28 under any loading conditions. More specifically, and in one operational embodiment, the electronically controlled brake 33 is always powered and is activated when power is cut. In this way, once the ball screw 26 and, thereby, the reciprocating extension member 32 is disposed in a predetermined position as explained in greater detail below, power is terminated to the electronically controlled brake 33 so that it is activated to prevent back drive. In addition, in the event of a power outage in the plant or to any specific linear actuator 14, the electronically controlled brake 33 is automatically activated to stop any movement of the reciprocating extension member 32. A linear bearing 36 is disposed between the housing 16 and the reciprocating extension member 32 for facilitating smooth linear motion of the reciprocating extension member 32 between its extended and retracted positions relative to the housing 16.

In one embodiment, the housing 16 is defined by an aluminum extrusion having a circular, square, or rectangular cross-section or any other suitable geometric shape. The linear bearing 36 is fitted within the interior of the extruded housing 16. A guide 38 is disposed between the ball screw 26 and the interior wall 39 of the extension member 32. The guide 38 reduces whipping of the ball screw 26. More specifically, in one embodiment, the ball screw 26 may be engineered with a relatively high pitch. This allows for fast movement of the ball screw 26, and by association, the reciprocating extension member 32. Under certain operating conditions, the ball screw 26 may have a tendency to "whip." The guide 38 reduces the whipping of the ball screw 26. To this end, the guide 38 may include a hollow cylindrical shaft disposed about the ball screw 26 which adds additional structural integrity to the assembly.

The housing 16 may also include cutouts for access to interior components and motor clearance. In this way, most of the components of the linear actuator 14 may be assembled outside of the housing 16 and then inserted therein and bolted into place. In one embodiment, the reciprocating extension member is a cylindrical tube 32. Moreover, in one embodiment, the cylindrical tube 32 may have a 2½ inch outer diameter with a ⅜ inch wall thickness. These particular dimensions reduce side deflection by a significant amount. Similarly, the linear bearing 36 eliminates alignment issues and reduces side deflection of the cylindrical tube 32. In this context, and in one embodiment, the linear bearing 36 may take the form of a Teflon coated linear bushing. The ball screw 26 may employ a ½ inch pitch so as to achieve more travel per revolution. The transmission 34 includes a gear set that reduces the speed of the drive motor 28 and increases torque for the motor. In one embodiment, the drive motor 28 is a smart servo motor with integrated amplifier and controller. This provides closed-loop feedback with low voltage controls and power. Each smart servo motor is connected to the controller 24 via a DC power line 25 and an Ethernet line 27 (FIG. 8). The Ethernet line 27 provides control signals between each servo motor 28 and the controller 24 as will be described in greater detail below. However, those having ordinary skill in the art will appreciate from the description set forth herein that the present invention is in no way limited to these particular dimensions or other details of the subcomponents of the linear actuator and that the information set forth immediately above is merely provided as a means of describing the best mode of carrying out the present invention.

Each of the linear actuators 14 includes a pneumatic control module, generally indicated at 35. The pneumatic control modules 35 are in fluid communication with a source of pressure and are adapted to provide positive and negative pressure to the end effector assemblies 20 and to subject the workpiece W to a vacuum. In addition, the pneumatic control modules 35 are also operable to provide positive pressure at the workpiece W as will be explained in greater detail below. The sensors 22 are responsive to contract with the workpiece W under the influence of the vacuum to establish a datum of the position of the linear actuator 14 relative to the workpiece W. Each of these features will be described in greater detail below.

More specifically, the end effector 20 includes an adapter 40 that is operatively mounted to the linear displacement member 18 and a datum assembly, generally indicated at 42, mounted for articulation relative to the adapter 40 so as to facilitate planer contact with and support the workpiece W. Referring specifically to FIGS. 4-6, the datum assembly 42 includes a lower portion 44 mounted for articulation relative to the adapter 40. The datum assembly 42 also includes an upper portion 46 that is moveably mounted relative to the lower portion 44. The upper portion 46 is responsive to the source of negative pressure to move in the direction of the lower portion 44 as will be described in greater detail below. The adapter 40 includes an adapter plate 48 (FIGS. 2 and 3) mounted to one end of the cylindrical tube 32 of the linear displacement member 18. A ball 50 is supported by the adapter plate 48 and extends between the adapter plate 48 and the lower portion 44 of the datum assembly 42. The lower portion 44 includes a spherical cup 52 that is adapted to receive and cooperate with the ball 50 to provide swiveling, non-rotational movement of the lower portion 44 relative to the adapter 40. In this context, the linear displacement member 18 defines a longitudinal axis A. As best shown in FIG. 6, the lower portion 44 of the datum assembly 42 is mounted to the ball 50 so as to provide swiveling, non-rotational movement up to 45° relative to the longitudinal axis A of the linear displacement member 18.

As noted above and best shown in FIGS. 4-5, the sensor 22 is supported by the lower portion 44 and is responsive to movement of the upper portion 46 under the influence of the negative pressure to establish a datum of the position of the linear actuator 18 relative to the workpiece W. To this end, a seal 54 is disposed between the upper portion 46 and the lower portion 44 of the datum assembly 42. The seal 54 acts to bias the upper portion 46 away from the lower portion 44. The upper portion 46 is movable toward the lower portion 44 and against the biasing force of the seal 54 under the influence of the vacuum generated by the source of negative pressure. In one embodiment, the seal 54 may be in the form of an O-ring. A filter 56 is supported in the lower portion 44 to filter the flow of air as will be described in greater detail below. In one embodiment, the filter 56 may include an annular sintered bronze filter that acts to keep pneumatic lines free of dust and other minute particles. However, those having ordinary skill in the art will appreciate from the description set forth herein that the present invention is in no way limited to the particular type of seal 54 or material used for the filter 56.

A flexible member 58 is employed to establish a pneumatic seal between the datum assembly 42 and the workpiece W. The flexible member 58 provides a path for fluid communication of the vacuum as well as positive pressure between the datum assembly 42 and the workpiece W. In one embodiment, the flexible member 58 may include an annular bellows or cup-shaped element mounted to the lower portion 44 and extending from the lower portion 44, past the upper portion 46 and adapted for sealing contact with the workpiece W. The flexible member 58 may also be referred to as a vacuum cup. One end of the flexible member 58 may be disposed in annular groove 59 formed in the lower portion 44 of the datum assembly 42. However, those having ordinary skill in the art will appreciate that any member that establishes a pneumatic seal between the datum assembly 42 and the workpiece W will suffice for these purposes.

Similarly, a flexible member 60 is employed to establish a pneumatic seal between the adapter plate 48 and the datum assembly 42. The flexible member 60 provides a path for fluid communication of a vacuum and positive pressure between the adapter plate 48 and the lower datum 44. In one embodiment, the flexible member 60 may include an annular bellows mounted between the datum assembly and the adapter plate 48. One end of the flexible member 60 is mounted in a groove 61 formed on the bottom of the lower portion 44 of the datum assembly 42. A retainer plate 63 is bolted or otherwise fixed to the bottom 65 of the lower portion 44 and further acts to retain the flexible member 60 relative to the datum assembly 42. This arrangement further facilitates the swiveling, but non-rotational, disposition of the datum assembly 42 relative to the ball 50 and the adapter plate 48. However, as noted above, those having ordinary skill in the art will appreciate that the flexible member 60 may encompass any sealing mechanism which is suitable for this purpose.

As best shown in FIGS. 2, 3, 7 and 7B a mounting plate 70 is adapted to mount the housing 16 relative to the fixture 12. A flexible member 72 extends between the mounting plate 70 and the adapter plate 48. The flexible member 72 is adapted to expand and contract with movement of the linear displacement member 18 between its extended and retracted positions. In this way, the flexible member 72 provides a shroud or dust cover around the linear displacement member 18 between the mounting plate 70 and the adapter plate 48. In one embodiment, the flexible member 72 includes an annular bellows mounted between the mounting plate 70 and the adapter plate 48. A clamping plate 71 may be employed to fixedly mount one end of the flexible member 72 to the mounting plate 70. The other end of the flexible member 72 may be mounted to the adapter plate 48 in a conventional manner. However, and as noted above, those having ordinary skill in the art will appreciate that the flexible member 72 may encompass any mechanism which serves to establish a path for fluid communication between the mounting plate 70 and the adapter plate 48.

The pneumatic control module 35 is shown schematically in FIG. 8 where its interaction with the drive motor 28 and controller 24 is also illustrated. The pneumatic control module 35 includes a vacuum control valve 74 that is in fluid communication with the source of pneumatic pressure 37 and is adapted to control the generation of the negative pressure at the vacuum cup 58. The source of pneumatic pressure 37 may include "shop air" or any other source of pneumatic pressure as is commonly known in the art. A pneumatic control valve 76 is in fluid communication with the source of pneumatic pressure as well as the vacuum control valve 74. The pneumatic control valve 76 is operable to alternatively and selectively subject the end effector assembly 20 to both positive and negative pressures as will be described in greater detail below.

The pneumatic control module 35 further includes a vacuum generator 78 that is disposed in fluid communication between the vacuum control valve 74 and the pneumatic control valve 76. The vacuum generator 78 is responsive to the flow of positive pressure delivered by the vacuum control valve 74 to generate a negative pressure and to communicate the negative pressure to the pneumatic control valve 76. A vacuum switch 80 is disposed between the vacuum generator 78 and the pneumatic control valve 76 to sense the level of vacuum generated by the pneumatic control module 35. In the embodiment illustrated herein, the pneumatic control module 35 includes a single fluid flow path 82 that extends between the pneumatic control valve 76 and the end effector assembly 20. The single fluid flow path 82 is adapted to alternatively and selectively communicate both positive and negative pressure between the pneumatic control valve 76 and the end effector assembly 20. Thus, the pneumatic control valve 76 receives positive pneumatic pressure through line 84 from the source of pneumatic pressure 37 and negative pressure through the vacuum line 86. In addition to the components discussed above, the pneumatic control module 35 may also include a filter for purposes of filtering the fluid that passes therethrough as well as any other like components that common sense and engineering expedience dictate for any given application.

As noted above, the universal holding fixture assembly 10 also includes a controller 24. Each of the linear actuators 14 include a drive motor 28 disposed in electrical communication with the controller 24 via the DC power line 25 and Ethernet line 27. In addition, in the embodiment illustrated in FIG. 8, the drive motor 28 is also disposed in electrical communication between the pneumatic control module 35 and the controller 24. To this end, the drive motor 28 may be a "smart" servo motor. Each of the drive motors 28 is adapted to respond to command signals from the controller 24 to selectively control the movement of the linear displacement members 18 between their retracted and extended positions. In addition, the drive motors 28 are further adapted to receive commands from the controller 24 to control the alternative, selective delivery of both negative and positive pressures to the end effector assemblies 20.

More specifically, the controller 24 sends commands to each of the smart servo motors 28 on each of the linear actuators 14 pursuant to a predetermined set of commands generated, for example, by a computer program. These commands may energize the motors 28 causing them to drive the ball screws 26 and thus move the nut 30 in rectilinear motion relative to the ball screw 26. Movement of the nut 30 moves the reciprocating extension member 32 between its extended and retracted positions. In its extended position, the extension member 32 causes the suction cup 58 to come into contact with the workpiece W. The controller 24 may then send commands to the smart servo motors 28 to control actuation of the pneumatic control module 35.

For example, the vacuum control valve 74 may be opened to allow flow of positive pressure past the vacuum generator 78. In one embodiment, the vacuum generator 78 may simply be a venturi that produces a vacuum in response to the flow of positive pressure therepast. A vacuum switch 80 may be employed to sense the level of vacuum in the vacuum line 81. The smart servo motor 28 may further be employed to actuate the pneumatic control valve 76 to provide a source of negative pressure to the vacuum cup 58 through the single fluid flow path 82. This vacuum is then communicated through a conduit 88 (FIGS. 2, 3, 7 and 7A) through the extension member 32 and to the adapter plate 48 where the conduit is connected via a quick connect. The negative vacuum pressure is then communicated through the flexible member 60 between the adapter plate 48 and the datum assembly 42. The vacuum flows through the datum assembly 42, past the sintered bronze filter 56 and is applied between the suction cup 58 and the workpiece W. This causes the datum assembly 42 and the workpiece W to be drawn together. The workpiece W then contacts the upper datum portion 46. The upper datum portion 46 then moves against the biasing force of the seal 54 and into contact with the sensor 22. The sensor 22 senses the position of the workpiece W relative to each individual linear actuator 14 to thereby establish a datum for that particular linear actuator relative to the workpiece W. This sensed datum position is then relayed to the controller 24 via electronic wiring schematically illustrated at 90 in FIGS. 4, 5 and 8.

Alternatively, the controller 24 may command the smart servo motor 28 to close the vacuum control valve 74 and actuate the pneumatic control valve 76 such that positive pressure is delivered through the single fluid flow path 82 to the suction cup 58. In this way, positive pressure is delivered through the conduit 88, the extension member 32, through the flexible member 60 and the datum assembly 42. Positive pressure flows past the sintered bronze filter 56 and between the suction cup 58 and the workpiece W. In this way, the workpiece W may be forced away from the suction cup 58. This may occur, for example, at the beginning or end of any manufacturing process. Under the influence of positive pressure, the workpiece W may be caused to "float" relative to the universal holding fixture assembly 10. This floating action assists in the loading, positioning and unloading of the workpiece W relative to the assembly 10. In any event, both positive and negative pressure is supplied to the vacuum cup 58 over the same fluid flow path 82.

Because each of the smart servo motors 28 on each of the linear actuators 14 is individually controlled by the controller 24, each linear actuator 14 may be moved into and out of engagement with the workpiece in a selective, dynamic manner. Moreover, the level of pressure and vacuum delivered to the vacuum cup 58 by the pneumatic control module 35 may also be individually controlled at each of the linear actuators 14.

In this way, the universal holding fixture assembly 10 of the present invention is extremely flexible and may be employed in connection with different workpieces and subsequent or different manufacturing processes. The universal holding fixture of the present invention employs linear actuators that quickly fix the workpiece and establish a datum and a plurality of points relative to the workpiece to precisely locate it. In addition, each of the linear actuators 14 may be quickly and efficiently moved relative to the workpiece W during different manufacturing operations such that these operations may proceed unimpeded by the presence of the linear actuator. To this end, the universal holding fixture assembly 10 of the present invention employs electronically controlled linear actuators 14 having pneumatic control modules 35 delivering both positive and negative pressure at the workpiece W. Finally, the programmable universal holding fixture assembly 10 of the present invention and the associated linear actuators 14 are robust, yet relatively mechanically simple and have a reduced number of components and accordingly, have a reduced cost of manufacture relative to many other universal holding fixtures known in the related art.

The invention has been described in an illustrative manner. It is to be understood that the terminology which has been used is intended to be in the nature of words of description rather than of limitation. Those having ordinary skill in the art will appreciate that many modifications and variations of the invention are possible in light of the above teachings. Therefore, within the scope of the claims, the invention may be practiced other than as specifically described.

What is claimed is:

1. A universal holding fixture assembly, said assembly comprising:
    a fixture and a plurality of linear actuators supported by said fixture and adapted to engage and support a workpiece relative to said fixture;
    each linear actuator including a housing operatively mounted to said fixture, a linear displacement member supported by said housing adapted to move linearly between a retracted position and an extended position, an end effector assembly operatively supported by said linear actuator and adapted to engage the workpiece when said linear displacement member is in said extended position, and a sensor operatively supported by said end effector assembly and responsive to contact with the workpiece to establish a datum of the position of the linear actuator relative to the workpiece;
    each of said linear actuators including a pneumatic control module in fluid communication with a source of pressure, said pneumatic control module adapted to control the delivery of positive and negative pressure at said end effector assembly and to subject the workpiece to the vacuum,
    said pneumatic control module including a vacuum control valve in fluid communication with said source of pneumatic pressure and adapted to control the generation of said negative pressure and a pneumatic control valve in fluid communication with said source of pneumatic pressure and said vacuum control valve, said pneumatic control valve operable to alternatively, selectively, subject said end effector assembly to positive and said negative pressures; and
    said sensor being responsive to contact with said workpiece under the influence of said vacuum to establish a datum of the position of said linear actuator relative to said workpiece.

2. The universal holding fixture as set forth in claim 1 wherein said end effector assembly includes an adapter operatively mounted to said linear displacement member and a datum assembly mounted for articulation relative to said adapter so as to facilitate planer contact with and support the workpiece.

3. The universal holding fixture as set forth in claim 2 wherein said datum assembly includes a lower portion mounted for articulation relative to said adapter and an upper portion movably mounted relative to said lower portion, said upper portion responsive to a source of negative pressure to move in the direction of said lower portion.

4. The universal holding fixture as set forth in claim 3 wherein said sensor is supported by said lower portion and responsive to movement of said upper portion under influence of said negative pressure to establish a datum of the position of said linear actuator relative to said workpiece.

5. The universal holding fixture as set forth in claim 3 wherein said adapter further includes an adapter plate mounted to one end of said linear displacement member and a ball supported by said adapter plate and extending between said adapter plate and said lower portion of said datum, said lower portion including a spherical cup adapted to receive and cooperate with said ball to provide swiveling, non-rotational movement of said lower portion relative to said adapter.

6. The universal holding fixture as set forth in claim 5 wherein said linear displacement member defines a longitudinal axis, said lower portion of said datum mounted to said ball so as to provide swiveling, non-rotational movement up to 45° relative to said longitudinal axis of said linear displacement member.

7. The universal holding fixture as set forth in claim 3 further including a seal disposed between said upper portion and said lower portion of said datum, said seal acting to bias said upper portion away from said lower portion, said upper portion moveable toward said lower portion and against the biasing force of said seal under the influence of the vacuum generated by said source of negative pressure.

8. The universal holding fixture as set forth in claim 3 further including a flexible member establishing a pneumatic seal between said datum assembly and the workpiece, said flexible member providing a path for fluid communication of the vacuum between said datum assembly and the workpiece.

9. The universal holding fixture as set forth in claim 8 wherein said flexible members includes an annular bellows mounted to said lower portion and extending between said lower portion, past said upper portion and adapted for sealing contact with the workpiece.

10. The universal holding fixture as set forth in claim 5 further including a flexible member establishing a pneumatic seal between said adapter plate and said datum assembly, said flexible member providing a path for fluid communication of the vacuum between said adapter plate and said lower datum.

11. The universal holding fixture as set forth in claim 10 wherein said flexible member includes an annular bellows mounted between said datum assembly and said adapter plate.

12. The universal holding fixture as set forth in claim 5 further including a mounting plate adapted to mount said housing relative to said fixture and a flexible member adapted to expand and contract with movement of said linear displacement member between said extended and retracted positions and to provide a cover around said displacement member between said mounting plate and said adapter plate.

13. The universal holding fixture as set forth in claim 12 wherein said flexible member includes an annular bellows mounted between said mounting plate and said adapter plate.

14. A universal holding fixture as set forth in claim 1 wherein said plurality of linear actuators defines a two-dimensional array, said assembly further including a controller adapted to individually control each one of said plurality of linear actuators such that said linear displacement members may be selectively moved from said retracted position to said extended position to engage the workpiece and such that each of said linear displacement members may be selectively moved from said extended position to said retracted position to clear said linear displacement member out of the path of a manufacturing operation.

15. The universal holding fixture as set forth in claim 1 wherein said linear displacement member further includes a ball screw mounted for rotation within said housing, a drive motor operatively mounted to said housing, said drive motor having a rotational output and adapted to drive said ball screw, a nut mounted to said ball screw and adapted to move linearly relative to said housing in response to rotation of said ball screw and a reciprocating extension member operatively coupled to said nut and extending between said nut and said end effector assembly, said nut acting to move said reciprocating extension member between said retracted and said extended positions.

16. The universal holding fixture as set forth in claim 15 wherein said linear actuator further includes a transmission operatively disposed between said drive motor and said ball screw, said transmission acting to reduce the speed and increase the torque of the rotational output of said drive motor and increase its increases the torque of said drive motor.

17. The universal holding fixture as set forth in claim 16 further including a linear bearing disposed between said housing and said reciprocating extension member for facilitating smooth rectilinear motion of said reciprocating extension member between said extended and retracted positions relative to said housing.

18. The universal holding fixture as set forth in claim 17 wherein said reciprocating extension member is a cylindrical tube.

19. The universal holding fixture as set forth in claim 18 further including a controller operatively connected in electrical communication with each of said plurality of linear actuators and adapted to provide signals to said linear actuators and receive signals from said sensors so as to move said linear displacement members between said retracted and extended positions and to sense the datum established by said sensors.

20. The universal holding fixture as set forth in claim 1 wherein said pneumatic control module further includes a vacuum generator disposed in fluid communication between said vacuum control valve and said pneumatic control valve, said vacuum generator responsive to the flow of positive pressure delivered by said vacuum control valve to generate a negative pressure and to communicate said negative pressure to said pneumatic control valve.

21. The universal holding fixture as set forth in claim 20 wherein said pneumatic control module further includes a vacuum switch disposed between said vacuum generator and said pneumatic control valve to sense the level of vacuum generated by said pneumatic control module.

22. The universal holding fixture as set forth in claim 1 wherein said pneumatic control module includes a single fluid flow path extending between said pneumatic control valve and said end effector assembly, said single fluid flow path adapted to alternatively and selectively communicate positive and negative pressure between said pneumatic control valve and said end effector assembly.

23. The universal holding fixture as set forth in claim 1 wherein said universal holding fixture includes a controller, each of said linear actuators including a drive motor disposed in electrical communication between said controller and said pneumatic control module, each of said drive motors adapted to respond to command signals from said controller to selectively control the movement of said linear displacement member between said retracted and extended positions and further adapted to receive commands from said controller to control the alternative, selective delivery of said negative and positive pressure to said end effector assembly.

24. A linear actuator comprising:
a housing;
a linear displacement member supported by said housing and adapted to move linearly between a retracted position and an extended position;
an end effector assembly operatively supported by said linear actuator and adapted to engage a workpiece when said linear displacement member is in said extended position, said end effector assembly including an adapter operatively mounted to said linear displacement member and a datum assembly mounted for articulation relative to said adapter so as to facilitate planer contact with and support of the workpiece, said adapter further including an adapter plate, said linear actuator further including a flexible member establishing a pneumatic seal between said adapter plate and said datum assembly, said flexible member providing a path of fluid communication of the vacuum between said adapter plate and said datum assembly; and
a sensor operatively supported by said end effector assembly and responsive to contact with the workpiece to establish a datum of the position of the linear actuator relative to the workpiece.

25. The linear actuator as set forth in claim 24 further including a pneumatic control module in fluid communication with a source of pressure, said pneumatic control module adapted to provide positive and negative pressure at said end effector assembly and to subject the workpiece to the vacuum, said sensor being responsive to contact with said workpiece under the influence of said vacuum to establish a datum of the position of said linear actuator relative to said workpiece.

26. The linear actuator as set forth in claim 24 wherein said datum assembly includes a lower portion mounted for articulation relative to said adapter and an upper portion movably mounted relative to said lower portion, said upper portion responsive to a source of negative pressure to move in the direction of said lower portion.

27. The linear actuator as set forth in claim 26 wherein said sensor is supported by said lower portion and responsive to movement of said upper portion under influence of said negative pressure to establish a datum of the position of said linear actuator relative to said workpiece.

28. The linear actuator as set forth in claim 27 further including a seal disposed between said upper portion and said lower portion of said datum, said seal acting to bias said upper portion away from said lower portion, said upper portion moveable toward said lower portion and against the biasing force of said seal under the influence of the vacuum generated by said source of negative pressure.

29. The linear actuator as set forth in claim 26 further including a flexible member establishing a pneumatic seal between said datum assembly and the workpiece, said flexible member providing a path for fluid communication of the vacuum between said datum assembly and the workpiece.

30. The linear actuator as set forth in claim 29 wherein said flexible members includes an annular bellows mounted to said lower portion and extending between said lower portion, past said upper portion and adapted for sealing contact with the workpiece.

31. The linear actuator as set forth in claim 24 wherein said flexible member includes an annular bellows mounted between said datum assembly and said adapter plate.

32. The linear actuator as set forth in claim 24 wherein said adapter plate is mounted to said linear displacement member, said linear actuator further including a mounting plate adapted to mount said housing relative to a fixture and a flexible member adapted to expand and contract with movement of said linear displacement member between said extended and retracted positions and to provide a cover around said linear displacement member between said mounting plate and said adapter plate.

33. A universal holding fixture as set forth in claim 32 wherein said flexible member includes an annular bellows mounted between said mounting plate and said adapter plate.

34. A linear actuator comprising:
    a housing;
    a linear displacement member supported by said housing and adapted to move linearly between a retracted position and an extended position;
    an end effector assembly operatively supported by said linear actuator;
    a pneumatic control module in fluid communication with a source of pressure, said pneumatic control module adapted to control the delivery of positive and negative pressure at said end effector assembly;
    said pneumatic control module including a vacuum control valve in fluid communication with said source of pneumatic pressure and adapted to control the generation of said negative pressure, and a pneumatic control valve in fluid communication with said source of pneumatic pressure and said vacuum control valve, said pneumatic control valve operable to alternatively, selectively, subject said end effector assembly to positive and said negative pressures; and
    a sensor operatively supported by said end effector assembly and responsive to contact with the workpiece under the influence of the vacuum to establish a datum of the position of the linear actuator relative to the workpiece.

35. The linear actuator as set forth in claim 34 wherein said end effector assembly includes an adapter operatively mounted to said linear displacement member and a datum assembly mounted for articulation relative to said adapter so as to facilitate planer contact with and support the workpiece.

36. The linear actuator as set forth in claim 35 further including a flexible member establishing a pneumatic seal between said datum assembly and the workpiece, said flexible member providing a path for fluid communication of a vacuum between said datum assembly and the workpiece.

37. The linear actuator as set forth in claim 36 wherein said flexible member includes an annular bellows mounted to said lower portion and extending between said lower portion, past said upper portion and adapted for sealing contact with the workpiece.

38. The linear actuator as set forth in claim 35 wherein said adapter includes an adapter plate, said linear actuator further including a flexible member establishing a pneumatic seal between said adapter plate and said datum assembly, said flexible member providing a path for fluid communication of a vacuum between said adapter plate and said lower datum.

39. The linear actuator as set forth in claim 38 wherein said flexible member includes an annular bellows mounted between said datum assembly and said adapter plate.

40. The linear actuator as set forth in claim 35 wherein said adapter includes an adapter plate, said linear actuator further including a mounting plate adapted to mount said housing relative to said fixture and a flexible member adapted to expand and contract with movement of said linear displacement member between said extended and retracted positions and to provide a cover around said linear displacement member between said mounting plate and said adapter plate.

41. The linear actuator as set forth in claim 40 wherein said flexible member includes an annular bellows mounted between said mounting plate and said adapter plate.

42. The linear actuator as set forth in claim 34 wherein said pneumatic control module further includes a vacuum generator disposed in fluid communication between said vacuum control valve and said pneumatic control valve, said vacuum generator responsive to the flow of positive pressure delivered by said vacuum control valve to generate a negative pressure and to communicate said negative pressure to said pneumatic control valve.

43. The linear actuator as set forth in claim 42 wherein said pneumatic control module further includes a vacuum switch disposed between said vacuum generator and said pneumatic control valve to sense the level of vacuum generated by said pneumatic control module.

44. The linear actuator as set forth in claim 34 wherein said pneumatic control module includes a single fluid flow path extending between said pneumatic control valve and said end effector assembly, said single fluid flow path adapted to alternatively and selectively communicate positive and negative pressure between said pneumatic control valve and said end effector assembly.

45. The linear actuator as set forth in claim 34 further including a drive motor disposed in electrical communication between a controller and said pneumatic control module, each of said drive motors adapted to respond to command signals from the controller to selectively control the movement of said linear displacement member between said retracted and extended positions and further adapted to receive commands from the controller to control the alternative, selective delivery of said negative and positive pressure to said end effector assembly.

46. A linear actuator comprising:
    a housing;

a linear displacement member supported by said housing and adapted to move linearly between a retracted and an extended position;

an end effector assembly operatively supported by said linear actuator, said end effector assembly including an adapter operatively mounted to said linear displacement member and a datum assembly mounted for articulation relative to said adapter so as to establish planer contact with and support the workpiece when said linear displacement member is in said extended position, said datum assembly including a lower portion mounted for articulation relative to said adapter and an upper portion moveably mounted relative to said lower portion, said upper portion responsive to a source of negative pressure to move in the direction of said lower portion; and a sensor operatively supported by said end effector assembly and responsive to contact with the workpiece to establish a datum of the position of the linear actuator relative to the workpiece.

47. The linear actuator as set forth in claim 46 further including a pneumatic control module in fluid communication with a source of pressure, said pneumatic control module adapted to control the delivery of positive and negative pressure at said end effector assembly and to subject the workpiece to the vacuum, said sensor being responsive to contact with said workpiece under the influence of said vacuum to establish a datum of the position of said linear actuator relative to said workpiece.

48. The linear actuator as set forth in claim 46 wherein said adapter further includes an adapter plate mounted to one end of said linear displacement member and a ball supported by said adapter plate and extending between said adapter plate and said lower portion of said datum, said lower portion including a spherical cup adapted to receive and cooperate with said ball to provide swiveling, non-rotational movement of said lower portion relative to said adapter.

49. The universal holding fixture as set forth in claim 48 wherein said linear displacement member defines a longitudinal axis, said lower portion of said datum mounted to said ball so as to provide swiveling, non-rotational movement up to 45° relative to said longitudinal axis of said linear displacement member.

* * * * *

UNITED STATES PATENT AND TRADEMARK OFFICE
CERTIFICATE OF CORRECTION

| | |
|---|---|
| PATENT NO. | : 8,079,578 B2 |
| APPLICATION NO. | : 11/899281 |
| DATED | : December 20, 2011 |
| INVENTOR(S) | : Bumgarner et al. |

It is certified that error appears in the above-identified patent and that said Letters Patent is hereby corrected as shown below:

Column 11, line 53 delete "increases its" between "and" and "increases".

Signed and Sealed this
Eighth Day of May, 2012

David J. Kappos
*Director of the United States Patent and Trademark Office*